(12) United States Patent
Oshima et al.

(10) Patent No.: US 6,276,119 B1
(45) Date of Patent: Aug. 21, 2001

(54) APPARATUS FOR SUSPENDING A MOWER UNIT FROM A VEHICLE BODY

(75) Inventors: Hiroshi Oshima; Yoshio Tomiyama, both of Osaka; Masaki Hayashi; Hiroshi Kawabata, both of Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/317,234

(22) Filed: May 24, 1999

(30) Foreign Application Priority Data

May 26, 1998 (JP) .................................. 10-143825

(51) Int. Cl.[7] .................................................. A01D 34/64
(52) U.S. Cl. ............................................. 56/17.1; 56/15.9
(58) Field of Search .................................. 56/17.1, 16.7, 56/208, 209, 15.9, 15.8, 15.2, 15.7, DIG. 22, 3, 10; 280/112.1, 112.2

(56) References Cited

U.S. PATENT DOCUMENTS

| | | | |
|---|---|---|---|
| 2,928,223 | * | 3/1960 | Danuser .................. 56/13.6 |
| 3,269,100 | * | 8/1966 | Smith ..................... 56/17.2 |
| 3,408,798 | * | 11/1968 | Hale et al. ................ 56/209 |
| 3,461,654 | * | 8/1969 | Plamper ................... 56/11.6 |
| 3,654,749 | * | 4/1972 | Ostergren et al. .......... 56/15.8 |
| 3,706,186 | * | 12/1972 | Hurlburt et al. ........... 56/15.8 |
| 3,783,594 | * | 1/1974 | Watt et al. ............... 56/15.8 |
| 4,035,997 | * | 7/1977 | Duca et al. ............... 56/209 |
| 4,085,571 | * | 4/1978 | Mortier et al. ............ 56/208 |
| 4,291,522 | * | 9/1981 | Kawasaki et al. .......... 56/15.8 |
| 4,301,881 | * | 11/1981 | Griffin .................. 180/6.48 |
| 4,416,109 | * | 11/1983 | Slazas ................... 56/209 |
| 4,577,455 | * | 3/1986 | Amano et al. ............. 56/17.1 |
| 4,707,971 | * | 11/1987 | Forpahl et al. ............ 56/6 |
| 4,711,072 | * | 12/1987 | Aldred ................... 56/6 |
| 4,926,621 | * | 5/1990 | Torras ................... 56/6 |
| 5,029,437 | * | 7/1991 | Dobberpuhl .............. 56/15.8 |
| 5,065,568 | * | 11/1991 | Braun et al. ............. 56/14.9 |
| 5,085,044 | * | 2/1992 | Freier, Jr. et al. ........ 56/13.5 |
| 5,297,378 | * | 3/1994 | Smith .................... 56/7 |
| 5,337,544 | * | 8/1994 | Lauritsen ................ 56/15.7 |
| 5,355,661 | * | 10/1994 | Tomiyama ................ 56/10.8 |
| 5,367,864 | * | 11/1994 | Ogasaware et al. ........ 56/15.8 |
| 5,381,648 | * | 1/1995 | Seegert et al. ............ 56/17.1 |
| 5,410,865 | * | 5/1995 | Kurohara et al. .......... 56/15.9 |
| 5,475,971 | * | 12/1995 | Good et al. .............. 56/14.9 |
| 5,483,789 | * | 1/1996 | Gummerson ............... 56/15.5 |
| 5,507,137 | * | 4/1996 | Norris ................... 56/10.2 J |
| 5,758,478 | * | 6/1998 | Bando et al. ............. 56/15.2 |
| 5,771,669 | * | 6/1998 | Langworthy et al. ....... 56/6 |
| 5,771,672 | * | 6/1998 | Gummerson ............... 56/15.4 |
| 5,784,870 | * | 7/1998 | Seegert et al. ........... 56/320.1 |
| 5,799,475 | * | 9/1998 | Borling et al. ........... 56/14.7 |
| 5,816,035 | * | 10/1998 | Schick ................... 56/15.2 |
| 5,937,625 | * | 8/1999 | Seegert .................. 56/16.7 |
| 5,946,893 | * | 9/1999 | Gordon ................... 56/15.8 |

FOREIGN PATENT DOCUMENTS

| | | | | |
|---|---|---|---|---|
| 1127531 | * | 9/1968 | (GB) | ................. 56/17.1 |
| 258003 | * | 9/1968 | (AT) | ................. 56/17.1 |
| 63-167819 | | 11/1988 | (JP) | . |
| 9272350 | | 10/1997 | (JP) | . |
| 9328019 | | 12/1997 | (JP) | . |

* cited by examiner

*Primary Examiner*—Robert E. Pezzuto
*Assistant Examiner*—Árpád Fábián Kovács
(74) *Attorney, Agent, or Firm*—Webb Ziesenheim Logsdon Orkin & Hanson, P.C.

(57) ABSTRACT

This invention relates to a suspension mechanism for a front mower or a mid-mount mower. A mower housing is suspended from a tractor body through a support axis extending in a fore and aft direction, and a seesaw arm pivotable about the support axis. Housing connectors, each having an elastic element such as a spring, are arranged between the seesaw arm and mower housing.

19 Claims, 6 Drawing Sheets

APPARATUS FOR SUSPENDING A MOWER UNIT FROM A VEHICLE BODY

BACKGROUND OF THE INVENTION

1. Field of the Invention

This invention relates to a mower suspension apparatus for suspending a mower unit from a vehicle body of a lawn tractor.

2. Description of the Related Art

Broadly, lawn tractors may be classified into two types. One is the ground-engaging type in which the mower unit is operable to cut grass while contacting the ground through auxiliary wheels. The other is the suspension type in which the mower unit is operable to cut grass while being suspended from the vehicle body to be afloat a predetermined distance above the ground The suspension type includes mid-mount type lawn tractors as disclosed in Japanese Patent Laying-Open Publications H9-328019 and H9-272350. Each of the mower units disclosed in these publications is suspended from the vehicle body through a total of four links, i.e. a pair of right and left front links and a pair of right and left rear links, to be capable of parallel vertical movement. The mower unit is vertically movable by vertically swinging the right and left rear links with a hydraulic cylinder, for example.

The suspension type mower unit basically is supported solely by the vehicle body, so that the entire weight of the mower unit acts on the vehicle body. Thus, this type of mower unit has advantages over the ground-engaging type mower unit in that a grass cutting height may be adjusted easily, and that the mower unit may be constructed lightweight or may be simplified.

On the other hand, however, the suspension type mower unit has the following drawback occurring on a sideways sloping ground, depending on such conditions as an angle of inclination and hardness of the turf. That is, the conventional lawn tractor has a mower unit suspended parallel to the vehicle body. When, for example, the right side of the vehicle body is higher than the left side, a shift in the center of gravity may cause the left wheels to sink deeper into the ground or become dented to a greater extent than the right wheels. This results in the vehicle body inclining to a greater degree than the angle of inclination of the ground. Then, the mower unit inclines by an acute angle to be no longer parallel to the ground. In this example, the mower unit inclines further rightward.

Then, the cutting height increases at the right side, and decreases at the left side. As a result, the mower unit leaves two uneven adjacent rows of grass.

The object of this invention is to provide a mower suspension apparatus with an improved suspension structure to mitigate the above drawback encountered on a sideways sloping ground, while maintaining the advantage of the suspension type.

SUMMARY OF THE INVENTION

The above object is fulfilled, according to this invention, by a mower suspension apparatus comprising a seesaw arm pivotably attached to a support axis secured to a mower housing. The seesaw arm is connected to a pair of links for suspending a mower unit from a tractor body.

Thus, when one side of the tractor body becomes higher than the other, the mower unit can roll relative to the tractor body. In this way, the mower unit is displaceable to a near horizontal posture relative to the ground.

In an embodiment of the invention, preferably, a pair of housing connectors are provided for relatively displaceably interconnecting the seesaw arm and housing. Preferably, each housing connector has an elastic device interposed between the seesaw arm and housing.

These elastic devices are effective to avoid a rolling of the mower unit occurring to a greater extent than is needed.

The housing may include a pair of right and left auxiliary rollers. Then, the mower unit is reliably prevented from rolling to a greater extent than is needed, to assure stability.

Other features of this invention will be apparent from the following description of the embodiment to be taken with reference to the drawings.

DETAILED DESCRIPTION OF THE PREFERRED EMBODIMENT

An embodiment of this invention will be described hereinafter with reference to the drawings.

In the following description, the terms fore and aft direction and transverse or right and left direction are defined as the forward, rearward, rightward and leftward directions with reference to a lawn tractor.

Figure 1:
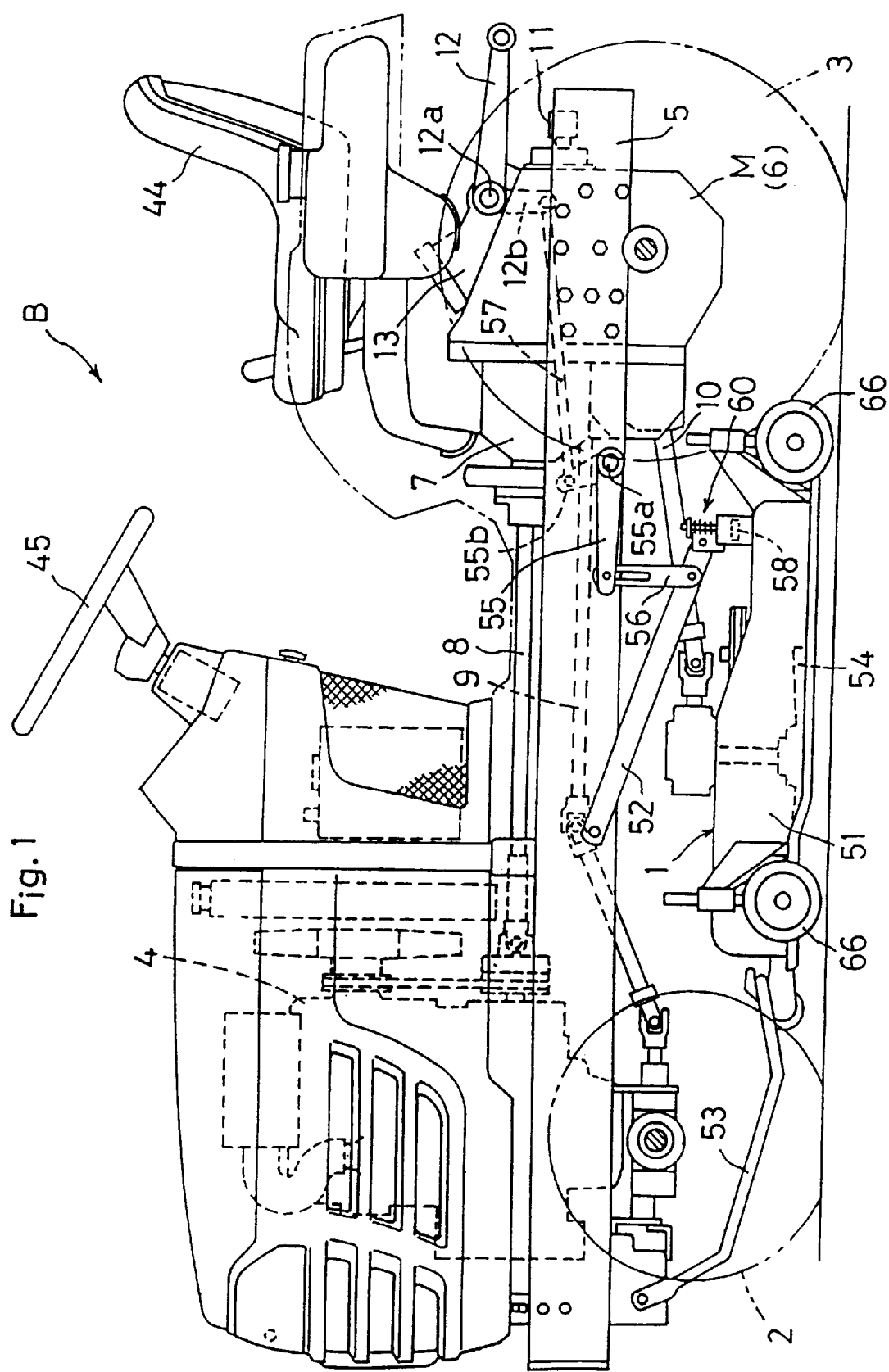
FIG. 1 is a side elevation of a mid-mount type riding lawn tractor in one embodiment of this invention.

FIG. 1 shows a mid-mount type riding lawn tractor, which is one example of tractors, having a mower unit 1 disposed under the tractor body between front wheels 2 and rear wheels 3. In this embodiment, the mid-mount type riding lawn tractor is cited as an example to which this invention is applicable. However, it should be apparent to a person skilled in the art from the following disclosure that the invention is applicable also to a front-mount tractor having a mower unit 1 disposed forwardly of front wheels 2.

The illustrated lawn tractor has an engine 4 disposed in a front position of the tractor body, and a transmission M disposed in a rear position of the tractor body. The engine 4 and transmission M are arranged between a pair of right and left body frames 5. A transmission case 6 has an HST 7 rigidly attached to the front thereof and drivably connected to the engine 4 through a drive shaft 8. A driver's seat 44 is disposed above the transmission case 6. Forwardly of the driver's seat 44 is a driving platform B including a steering wheel 45.

The transmission M has, projecting forwardly therefrom, a front wheel drive shaft 9 for driving the front wheels 2, and a mid-PTO shaft 10 for driving the mower unit 1. A rear PTO shaft 11 projects rearwardly from the transmission M for driving a rear working implement not shown. A hydraulic cylinder 13 is formed integral with an upper portion of transmission case 6 for raising and lowering the rear working implement, and axes 12a of lift arms 12 are supported in upper positions of transmission case 6. The body frames 5 are formed of a plate having a vertically elongate section, and the transmission case 6 is bolted to inner walls thereof.

Figure 2:
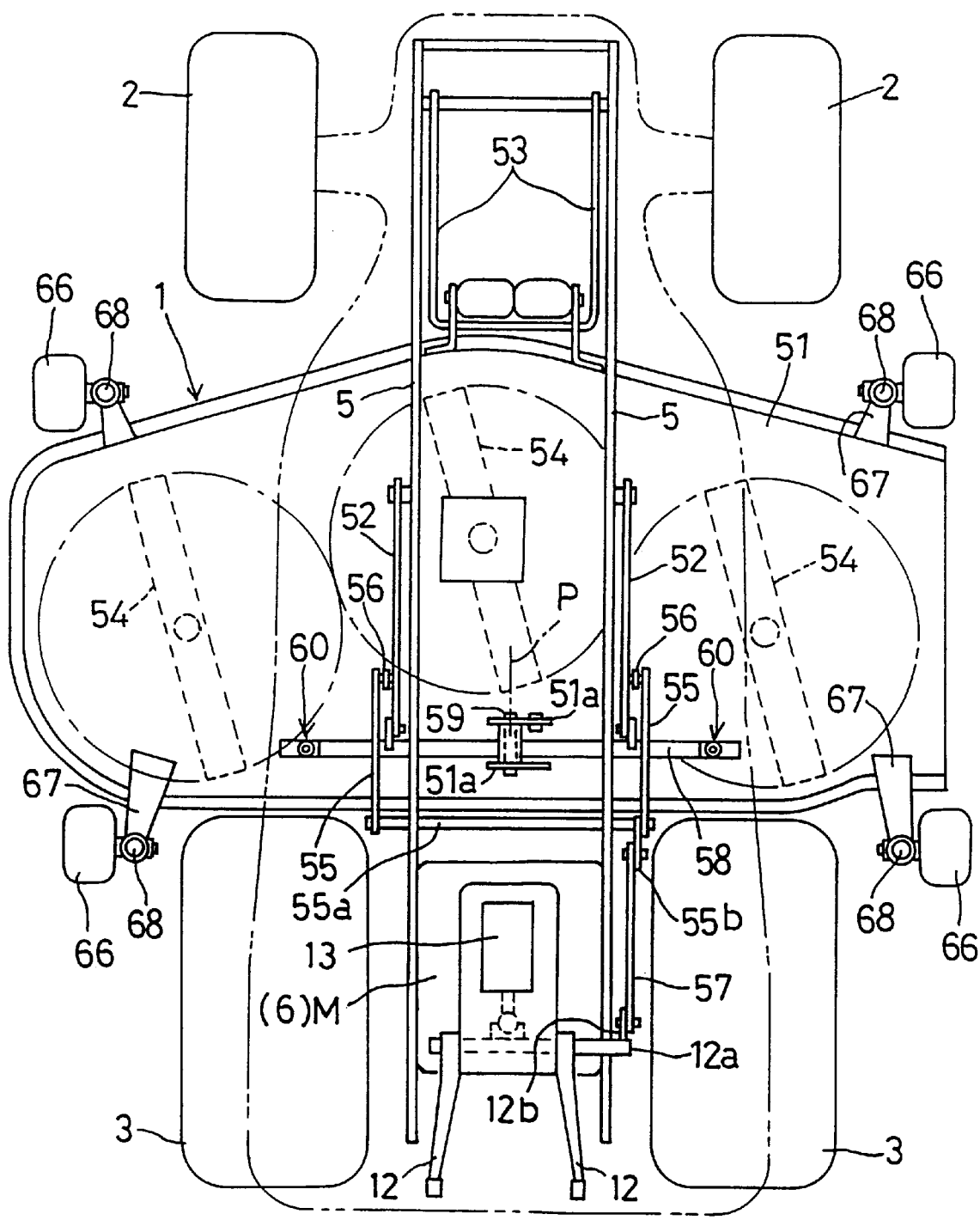
FIG. 2 is a plan view of a principal portion of the mid-mount type riding lawn tractor shown in FIG. 1.
Figure 3:
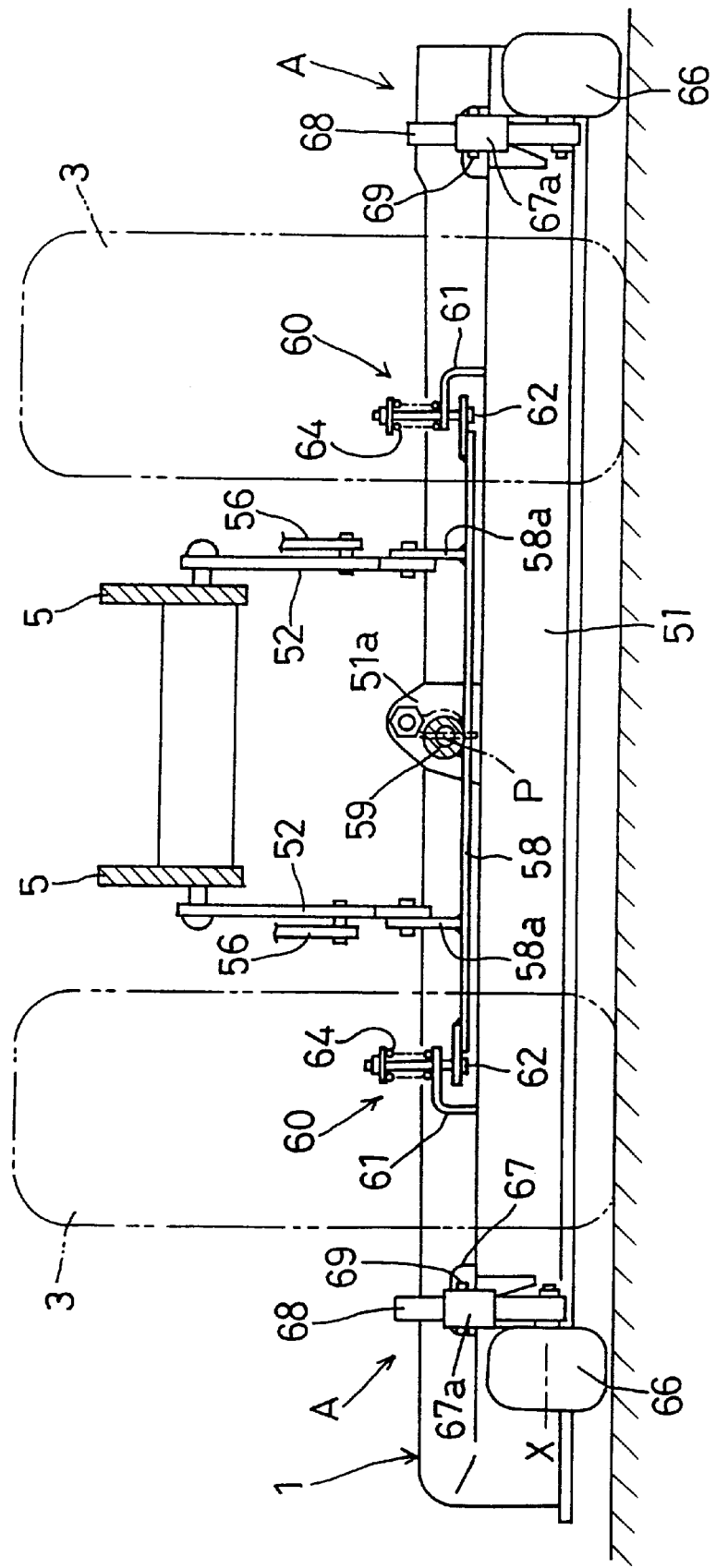
FIG. 3 is a rear view showing a rolling support structure for a mower unit.

As shown in FIGS. 2 and 3, the mower unit 1 includes three rotary blades 54 arranged in a mower housing 51. The mower unit 1 is connected for vertical parallel movement through a parallelogram link mechanism including a pair of right and left rear links 52 pivotally connected to outer positions of the right and left body frames 5, and a pair of right and left front links 53 pivotally connected to front positions of the body frames 5. The rear links 52 are connected in rearward positions thereof, through lift rods 56, to forward ends of lift arms 55 pivotally connected to the body frames 5. The right and left lift arms 55 are interconnected through a penetration shaft 55a to be vertically movable together.

Each of the rear links 52 is connected, to be pivotable through a pin 58b, to a projection 58a fixed to an upper surface of a seesaw arm 58 to be described hereinafter. An arm portion 55b integrated with the right lift arm 55 is connected through a connecting link 57 to an arm portion 12b attached to the right lift arm 12. When the hydraulic cylinder 13 is extended in a direction to raise the lift arms 12, the rear links 52 are raised through the connecting link 57 and lift arms 55, thereby raising the mower unit 1. That is, the hydraulic cylinder 13 for raising and lowering the rear working implement is used also for raising and lowering the mower unit 1.

As shown in FIG. 3, the mower housing 51 includes a pin 59 mounted in an upper rear position thereof to act as a support axis extending in the fore and aft direction through a transversely intermediate position. The seesaw arm 58 is supported to be pivotable about a fulcrum P provided by the pin 59. The rear links 52 are connected to the seesaw arm 58 to the right and left sides of the fulcrum P. The pin 59 is attached to a pair of front and rear brackets 51a secured to the upper surface of mower housing 51. With this construction, the mower unit 1 is attached to be capable of rolling within a predetermined range relative to the vehicle body.

A pair of housing connectors 60 are arranged to the right and left sides of the pin 59 for connecting the seesaw arm 58 to the mower housing 51. These housing connectors 60 will be described next.

The housing connectors 60 have a biasing function to act on the opposite lateral ends of seesaw arm 58 and reinstate the seesaw arm 58 and the upper surface of mower housing 51 in a mutually parallel posture.

Figure 4:
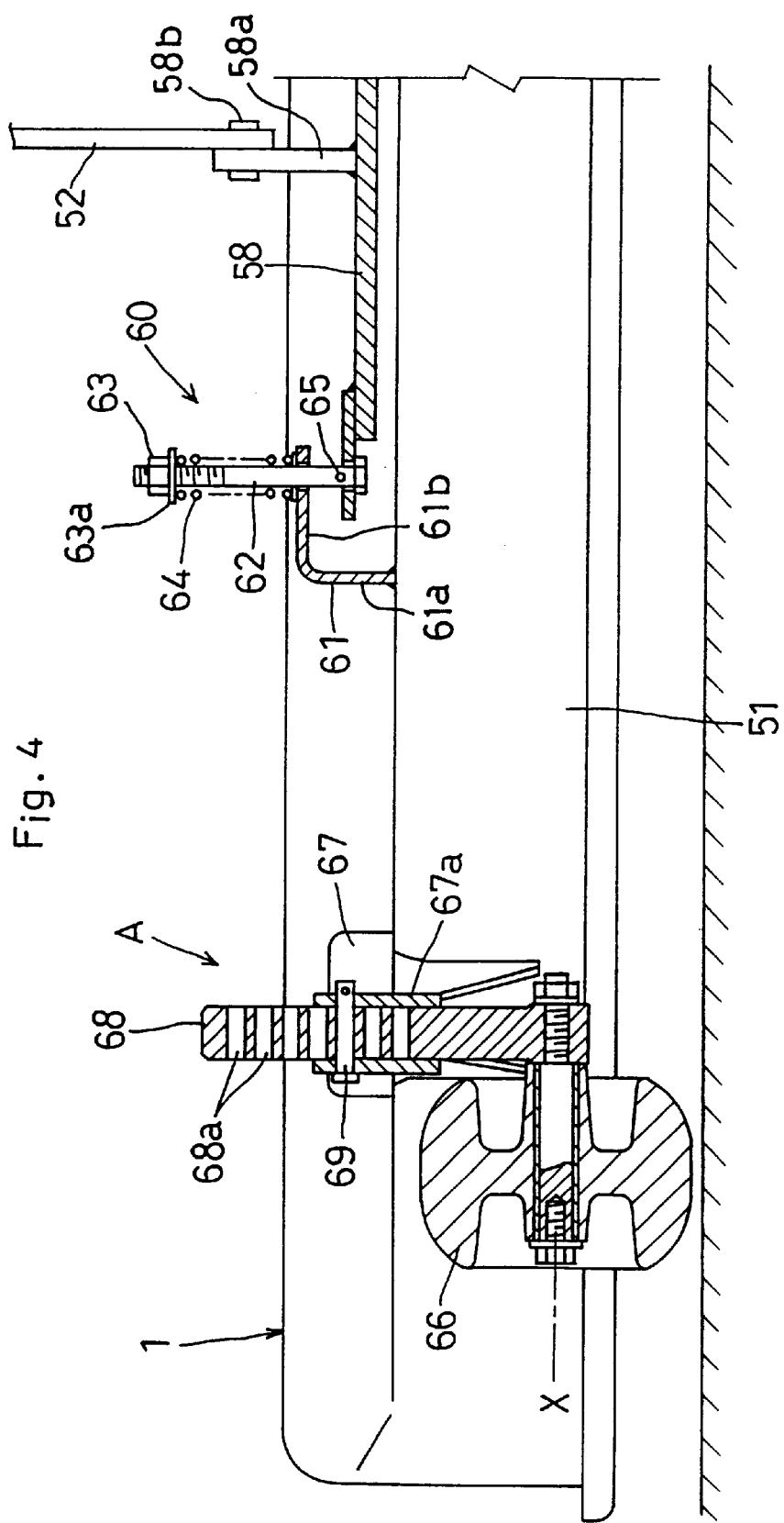
FIG. 4 is a rear view, partly in section, of the rolling support structure.

As shown in FIG. 4, each housing connector 60 includes an L-shaped member 61 fixed to the upper surface of mower housing 51. The L-shaped member 61 includes a first portion 61a having a lower end thereof welded to the upper surface of mower housing 51, and a second portion 61b extending substantially horizontally from an upper end of the first portion 61a. The second portion 61b defines a bore for receiving a bolt 62.

The bolt 62 extends upward through the seesaw arm 58 and Lshaped member 61, and constitutes a third portion with a nut 63 and a washer 63a. The housing connector 60 further includes a coil spring 64 which is one example of elastic device mounted on the bolt 62 between the nut 63 and L-shaped member 61, and a retainer pin 65 for maintaining the seesaw arm 58 engaged with the bolt 62 adjacent a head thereof That is, the coil spring 64 is disposed between a lower surface of washer 63a and an upper surface of second portion 61b. The washer 63a is not absolutely necessary, but the coil spring 64 may be placed in direct contact with a lower surface of nut 63.

A pneumatic or hydraulic damper may be employed as one example of elastic device.

With the above construction, the coil spring 64 applies a force through the bolt 62 to each opposite end of seesaw arm 58 to bias the seesaw arm 58 upward. By balancing the two biasing forces, the seesaw arm 58 and the mower unit 1 or mower housing 51 are maintained in a mutually parallel posture. Consequently, the mower unit 1 is parallel to the vehicle body in a free state, but when an external force stronger than a predetermined force acts on the mower unit 1, one of the coil springs 64 expands and the other contracts. This allows the mower unit 1 to roll relative to the vehicle body.

By adjusting the position of nut 63 relative to the bolt 62, a relative posture between the seesaw arm 58 and mower housing 51 may be set as desired, i.e. parallel, the right side up or the right side down, within a vertical spacing between the mower housing 51 and L-shaped member 61.

As shown in FIGS. 3 and 4, four rollers 66 acting as auxiliary ground-engaging elements are arranged in right, left, front and rear positions of mower housing 51. Each roller 66 has a height adjustable relative to the mower housing 51 through a height adjusting mechanism A. The mower housing 51 includes members 67 projecting forward or rearward and each having a vertical boss 67a for receiving and supporting a support shaft 68. One of the rollers 66 is supported by a lower portion of support shaft 68 to be rotatable about a transverse axis X. The support shaft 68 and vertical boss 67a are rigidly interconnected by a cross pin 69 inserted therethrough. The support shaft 68 defines a plurality of pin bores 68a arranged vertically for receiving the cross pin 69. The height of roller 66 relative to the mower housing 51 may be varied by selecting an appropriate one of pin bores 68a.

Figure 5A:
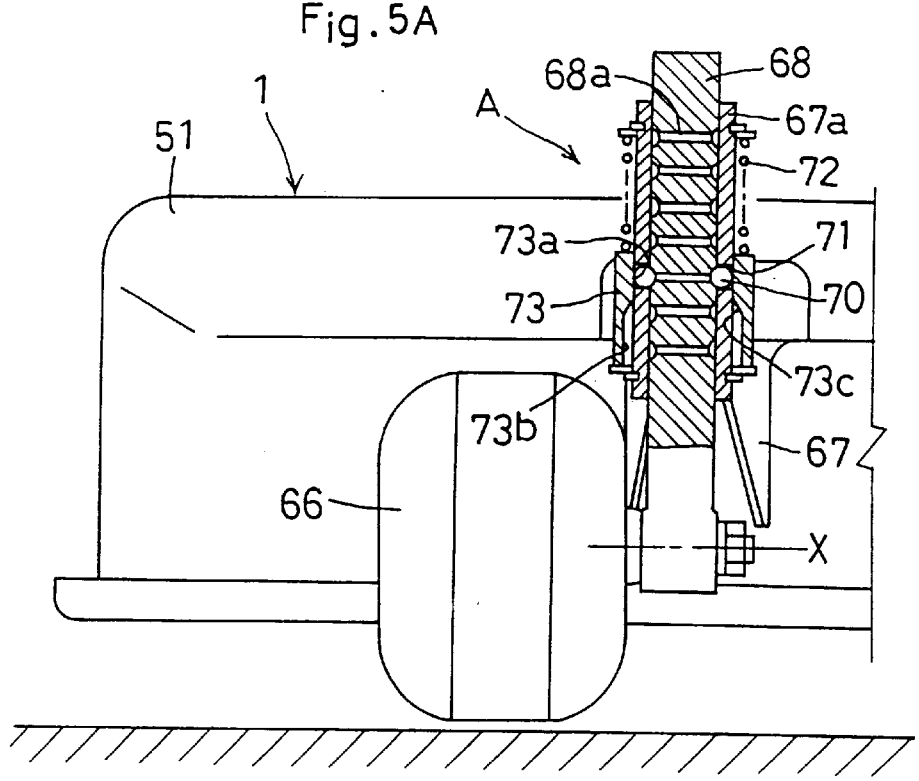
FIGS. 5A and 5B are sectional views of a modified height adjusting mechanism.
Figure 5B:
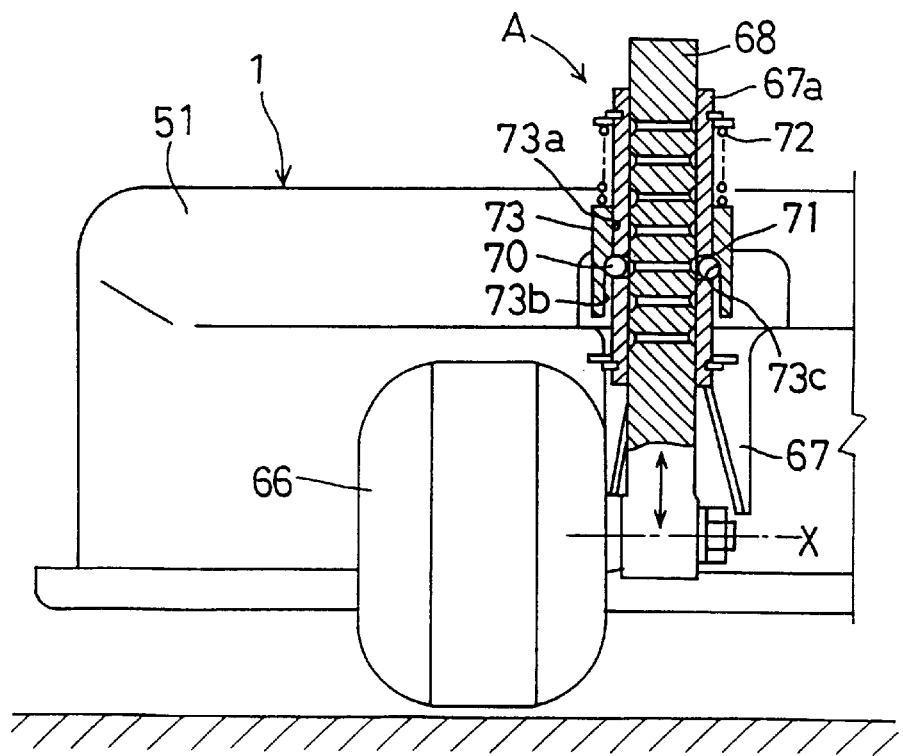

The height adjusting mechanism A may be modified as shown in FIGS. 5A and 5B. This height adjusting mechanism A includes a pair of balls 70 mounted between and engaging the support shaft 68 and vertical boss 67a to determine a relative height therebetween. For this purpose, pin bores 68a are shaped to have diverging ends, and the vertical boss 67a defines ball-receiving bores 71. A control sleeve 73 is fitted around the vertical boss 67a and biased to be movable downward in a predetermined range by a coil spring 72.

The control sleeve 73 includes a blocking surface 73a for maintaining the balls 70 in a position bridging the support shaft 68 and vertical boss 67a, a releasing surface 73b for allowing the balls 70 to disengage from the support shaft 68, and a tapered surface 73c formed between the two surfaces 73a and 73b. In an operative position lowered by the coil spring 72, the control sleeve 73 locks the support shaft 68 and vertical boss 67a to each other. When the control sleeve 73 is slid upward against the biasing force of coil spring 72, the balls 70 become disengageable from the support shaft 68. In this state, the support shaft 68 may be slid vertically to adjust the height of roller 66. Subsequently, the control sleeve 73 may be released to return to the operative position under the biasing force of coil spring 72, whereupon the tapered surface 73c pushes in the balls 70.

Grass cutting states of the mower unit 1 will be described next.

Figure 6A:
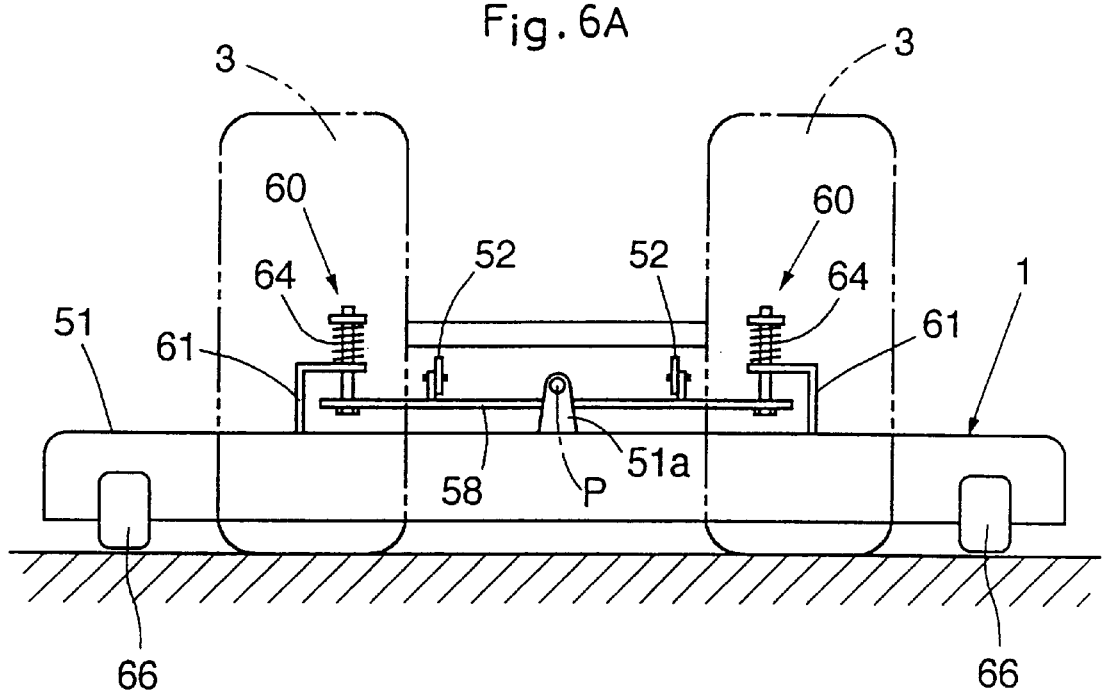
FIG. 6A is a rear view showing a relationship in right and left inclining posture between vehicle body and mower unit on a level ground.

On a level ground, as shown in FIGS. 3 and 6A, the vehicle body is parallel to the ground in the transverse direction. That is, the mower housing 51 and seesaw arm 58 are parallel to each other and in horizontal posture. The mower unit 1 may cut grass at a predetermined height. At this time, the right and left rear links 52 bear the weight of mower unit 1. In order to keep the rollers 66 free from load, a suitable mower supporting height is selected according to a cutting height setting, so that the rollers 66 are slightly lifted from the ground.

Consequently, where the ground is slightly elevated, the rollers 66 contact and mount the ground to secure the predetermined cutting height. With the action of right and left housing connectors 60, the mower unit 1 does not roll inadvertently about the fulcrums P in the event of minor turbulence such as running vibration. This feature effectively restrains variations in the cutting height.

Figure 6B:
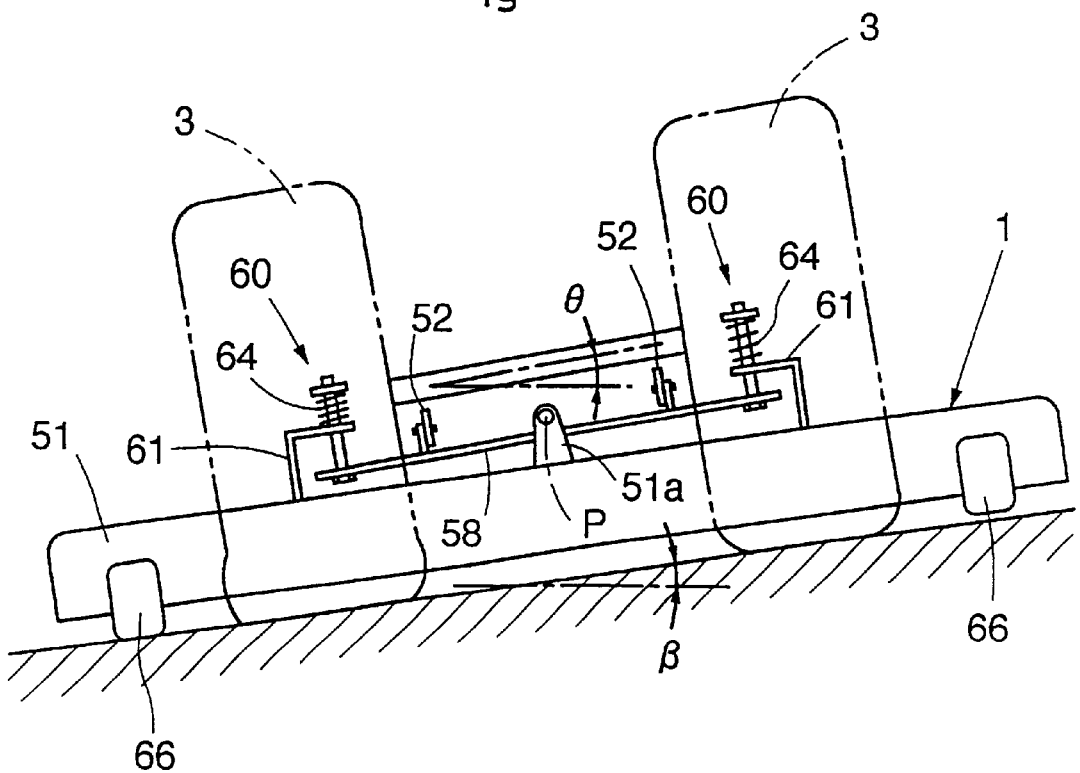
FIG. 6B is a rear view showing a relationship in right and left inclining posture between vehicle body and mower unit on a sideways sloping ground

On a turf rising rightward by a considerable degree, as shown in FIG. 6B, a shift in the center of gravity causes the left wheels 2 and 3 in the lower level to sink into the ground. As a result, the vehicle body inclines sideways by an angle θ which is greater than an angle β of ground inclination. However, the left front and rear rollers 66 come into contact with the ground to support the mower unit 1. Then, the left coil spring 64 contracts, and the right coil spring 64 extends. Consequently, even though the seesaw arm 58 is parallel to the vehicle body, the mower housing 51, i.e. the mower unit 1, is maintained approximately parallel to the ground.

Thus, even where the ground slopes transversely of the tractor body, the cutting height is maintained constant transversely of the mower unit 1. The mower unit 1 may cut grass at a substantially uniform height instead of leaving stepped rows of cut grass as experienced in the prior art.

The embodiment described above discloses only a specific example of implementing this invention. The foregoing embodiment may be varied without deviating from the scope of this invention. For example, the mower suspension apparatus of this invention may be incorporated into the type not having the rollers 66.

What is claimed is:

1. A mower suspension apparatus for a lawn tractor having a tractor body, comprising:
   a housing of a mower unit;
   a pin defining a support axis attached to said housing and extending in a fore and aft direction of the tractor body;
   a seesaw arm pivotably attached to said pin to pivot about said support axis;
   a pair of right and left links for connection of said housing to the tractor body;
   a pair of link connectors arranged to a right side and a left side of said support axis for connecting said seesaw arm to said pair of right and left links; and
   a pair of right and left housing connectors for relatively displaceably interconnecting said seesaw arm and said housing, said right and left housing connectors being arranged in a direction transversely outwardly of the tractor body with a distance to said right and left links, respectively.

2. A mower suspension apparatus as defined in claimed 1, wherein each of said housing connectors has elastic means interposed between said seesaw arm and said housing.

3. A mower suspension apparatus as defined in claim 2, wherein each of said housing connectors has a first portion extending upward from said housing, a second portion continuous with an upper end of said first portion and extending substantially horizontally, and a third portion extending from said seesaw arm to a position above said second portion, said elastic means being disposed between a downwardly facing surface disposed in an upper position of said third portion and an upwardly facing surface formed on said second portion.

4. A mower suspension apparatus as defined in claim 3, wherein said third portion extends through said second portion.

5. A mower suspension apparatus as defined in claim 2, wherein said elastic means comprises a spring.

6. A mower suspension apparatus as defined in claim 2, wherein said elastic means comprises a damper.

7. A mower suspension apparatus as defined in claim 1, wherein said housing of said mower unit is disposed between a pair of front wheels and a pair of rear wheels supporting said tractor body.

8. A mower suspension apparatus as defined in claim 1, wherein said housing of said mower unit is disposed forwardly of a pair of front wheels supporting said tractor body.

9. A mower suspension apparatus as defined in claim 1, wherein said housing includes a pair of right and left auxiliary rollers.

10. A mower suspension apparatus as defined in claim 9, wherein each of said auxiliary rollers is attached to said housing through a height adjusting mechanism for enabling adjustment of a height of attachment to said housing of the auxiliary roller.

11. A mower suspension apparatus for a lawn tractor having a transmission case mounted on a tractor body, comprising:
    a housing of a mower unit;
    a pin defining a support axis attached to said housing and extending in a fore and aft direction of the tractor body;
    a seesaw arm pivotably attached to said pin to pivot about said support axis;
    a pair of right and left links for connection of said housing to the tractor body;
    a pair of link connectors arranged to a right side and a left side of said support axis for connecting said seesaw arm to said pair of right and left links; and
    a pair of right and left housing connectors for relatively displaceably interconnecting said seesaw arm and said housing in positions outwardly of said transmission case in a direction transversely of said tractor body, said right and left housing connectors being arranged in a direction transversely outwardly of the tractor body with a distance to said right and left links, respectively.

12. A mower suspension apparatus as defined in claim 11, wherein each of said housing connectors has elastic means interposed between said seesaw arm and said housing.

13. A mower suspension apparatus as defined in claim 12, wherein each of said housing connectors has a first portion extending upward from said housing, a second portion continuous with an upper end of said first portion and extending substantially horizontally, and a third portion extending from said seesaw arm to a position above said second portion, said elastic means being disposed between a downwardly facing surface disposed in an upper position of said third portion and an upwardly facing surface formed on said second portion.

14. A mower suspension apparatus as defined in claim 13, wherein said third portion extends through said second portion.

15. A mower suspension apparatus as defined in claim 12, wherein said elastic means comprises a spring.

16. A mower suspension apparatus as defined in claim 11, wherein said housing of said mower unit is disposed between a pair of front wheels and a pair of rear wheels supporting said tractor body.

17. A vower suspension apparatus as defined in claim 11, wherein said housing of said mower unit is disposed forwardly of a pair of front wheels supporting said tractor body.

18. A mower suspension apparatus as defined in claim 11, wherein said housing includes a pair of right and left auxiliary rollers.

19. A mower suspension apparatus as defined in claim 18, wherein each of said auxiliary rollers is attached to said housing through a height adjusting mechanism for enabling adjustment of a height of attachment to said housing of the auxiliary roller.

* * * * *

UNITED STATES PATENT AND TRADEMARK OFFICE
CERTIFICATE OF CORRECTION

PATENT NO. : 6,276,119 B1
DATED : August 21, 2001
INVENTOR(S) : Hiroshi Oshima et al.

It is certified that error appears in the above-identified patent and that said Letters Patent is hereby corrected as shown below:

Title page,
Item [56] References Cited, U.S. PATENT DOCUMENTS, refer to U.S. Patent No. 5,367,864: "Ogasaware" should read -- Ogasawara --.

Column 3,
Line 62, "Lshaped" should read -- L-shaped --.

Column 4,
Line 1, after "thereof" insert -- period (.) --.

Column 7, claim 17,
Line 3, "Avower" should read -- A mower --.

Signed and Sealed this

Twenty-sixth Day of February, 2002

Attest:

JAMES E. ROGAN
Attesting Officer   Director of the United States Patent and Trademark Office